United States Patent Office 3,255,352
Patented June 7, 1966

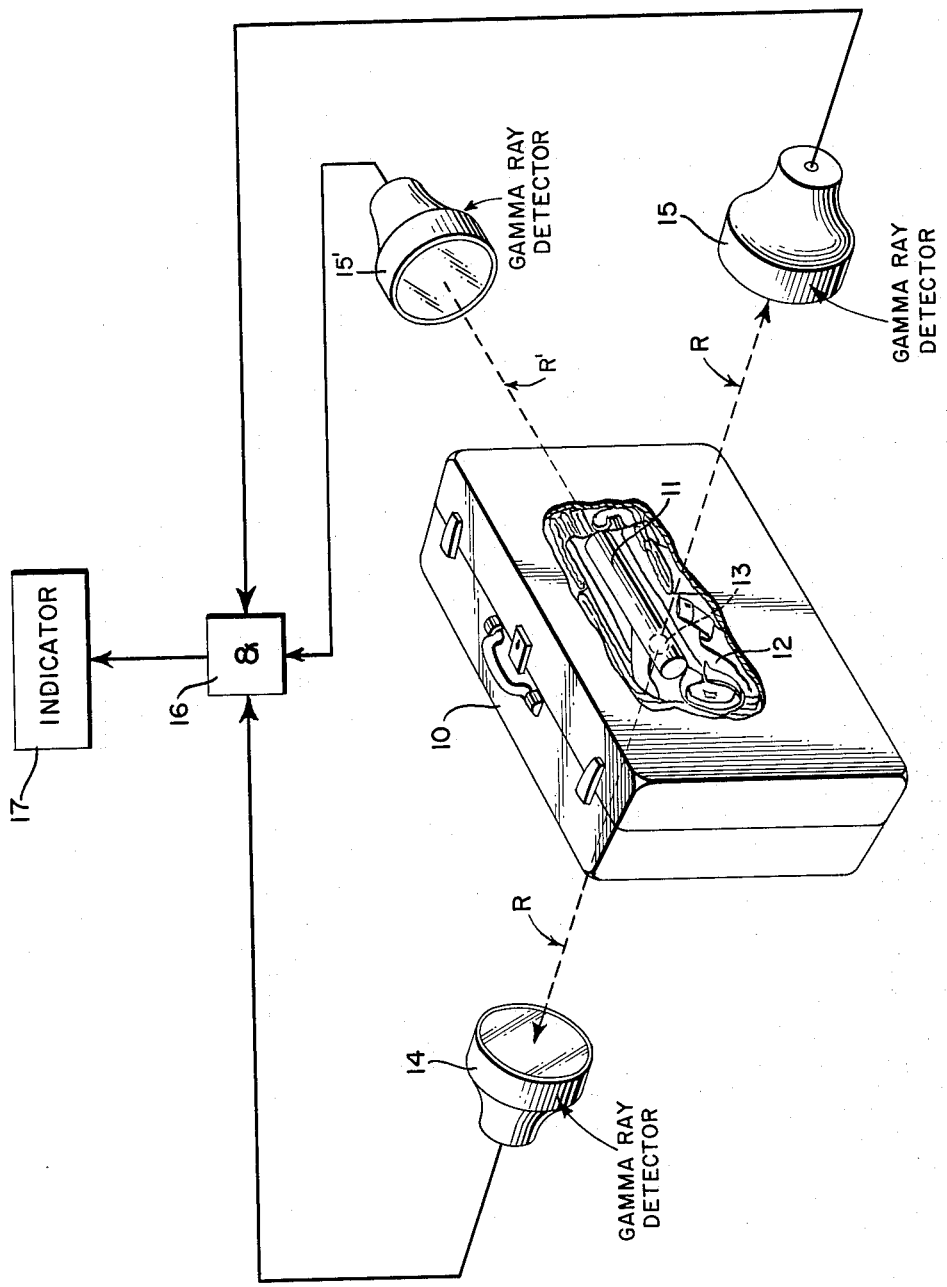

3,255,352
RADIOACTIVE METHOD OF DETECTION OF HIDDEN EXPLOSIVES
William H. Johnston, Baltimore, Md., assignor to William H. Johnston Laboratories, Inc., Baltimore, Md., a corporation of Maryland
Filed Sept. 6, 1962, Ser. No. 221,765
6 Claims. (Cl. 250—83.3)

This invention relates to the detection of the presence of hidden explosives, and, more particularly, to the use of a radioactive tag for detection of explosives hidden in airline baggage and on airline passengers. In the past several years a great deal of interest has been expressed in detection of the presence of hidden explosives in airline baggage and on airline passengers, particularly by reason of several unfortunate crashes with loss of life. An extensive survey of possible utilizable methods of explosive detection, including the use of radioactive tags, has been made for this purpose, but the methods suggested have in general been impractical by reason of the various factors involved. One factor is that the radioactive tag or tracer cannot be present in sufficient quantity that a health hazard will result. Further, the tag must be of such nature as to emit detectable radiation which will pass through the passenger's clothing and the baggage and other materials therein which might absorb the radiation. Further, the detectors must be able to distinguish between such sources of radiation as cosmic rays and radium dial wrist watches and clocks, and an actual tagged explosive. So far as is known, no practical method for radiation detection of the presence of explosives has been suggested until the advent of this invention.

It has been suggested that radioactive material might be used to label dynamite, not for purpose of detection of explosives in airline baggage but rather in order that dynamite sticks which are either lost, misplaced or misfired can be located. This suggestion appears in a news item in the New York Times for August 18, 1957, and indicates that radioactive antimony was added to the dynamite mixture during manufacture, by the Federal Mines Department of Canada. This article does not suggest the use of the coincidence gamma ray detection principle which forms an essential feature of this invention.

An object of the present invention is to detect the presence of explosive material in airline baggage and on airline passengers with a minimum of counting time and a minimum of expense for detectors. These objects are achieved by labeling explosive material, or one or more ingredients or constituents of an explosive device, with a radioactive material which functions during decay to cause emission of a plurality of substantially time-coincident gamma rays. Then, the presence of the tagged explosive can be detected by detecting gamma rays at a plurality of different positions adjacent one or more locations through which the passengers and/or baggage pass and by furnishing an indication only when substantial time coincidence is indicated between such detections. Various types of radioactive tracer materal may be employed, but it is preferred that positron emitters be used, since a pair of gamma rays are emitted during annihilation of positrons from such emitters, such pair being not only time correlated but also direction correlated. Specifically, during positron annihilation, gamma rays are simultaneously emitted in opposite directions from the position of annihilation. Then, even with use of a very small quantity of the radioactive tracer, detections of cosmic rays or of gamma emission from radioactive dials may be discriminated against, since the likelihood of time and direction coincidence from such sources of radiation is extremely small. Further, the time required for detection with a reasonable confidence level can be materially reduced when time and direction coincidence detection is employed. This feature in itself is significant, since it is obviously not desired that there be a very material delay between the actual checking of airline baggage and departure of the airplane. In fact, the very material increase in signal-to-noise ratio achieved with the invention makes it possible that detection be accomplished in a very short time period.

The use of positron emitters as radioactive tags or tracers has been suggested for several different purposes in the past, such purposes including the study of brain tumors and lung function. However, so far as is known the use of such tracers, and particularly the use of the time and direction correlation of gamma rays developed during decay of such tracers, has not been heretofore suggested as useable for the detection of the presence of explosives in airline baggage and on airline passengers.

Suitable positron emitter materials include $Na^{22}$ and $Al^{26}$, both of which have quite long half lives. It might also be possible to use positron emitters having shorter half lives, particularly if the shelf life of the explosive were reduced to a level of the order to several half lives of the particular tracer employed. For example, it might be possible to provide a detonator or blasting cap with a device which would render the detonator insensitive at the end of a particular time interval, such as a few months. Then, such positron emitters as $As^{74}$ and $Rh^{102}$, which have relatively short half lives, could be employed. It is preferred, however, that $Na^{22}$ or $Al^{26}$ be used, because of their relatively long half lives, and specifically that $Na^{22}$ be employed because of its much lower expense than $Al^{26}$. Nevertheless, it not intended to eliminate any practical positron emitter from the scope of this invention, since other positron emitters than those specifically mentioned may well be utilizable.

Another feature of advantage to the use of positron emitters as radioactive tags is the emission by such materials of a gamma ray coincident with the emission of the positron. Since the positron is annihilated in an extremely short time period from the moment of its generation, the delay between the emission of the gamma ray coincident with the positron and the emission of the correlated pair of gamma rays due to positron annihilation is so small that all three gamma rays are in substantial time coincidence. That is, the time delay is shorter than that detectable by the types of detectors now conventionally employed for detection of radiation from radioactive material. Consequently, when a positron emitter is used as a tag, three detectors may be employed, with two of the detectors at opposite sides of the baggage and the third detector located elsewhere adjacent the baggage. Then, when all three detectors respond to a gamma ray simultaneously, an indication of the presence of explosive material may be given. The use of these three detectors of course enables detection with a high confidence level, since it is very unlikely that three gamma rays would be simultaneously detected by the three detectors in the absence of the positron emitter.

While the positron emitters are preferred as radioactive tags in use to the present invention, it is also possible that other types of radioactive material be employed, so long as such material furnishes a plurality of time-coincident gamma rays. Various radioactive isotopes furnish time-coincident gamma rays during decay, even though the directions of such gamma rays are not correlated, as are positron annihilation gamma rays. Suitable radioactive tags of this type for use in the invention include $Cs^{134}$ and $Co^{60}$. Both have half lives of reasonable value for use in the present invention such that the radioactive tag associated with the explosive constituent or device will not have decayed to a level such as to prevent detection, within a reasonable shelf life of the explosive. However, it is not intended to exclude other coincident gamma ray sources from use in the present invention, since others than the two specifically mentioned may be employed.

It has been suggested, e.g. in Robinson and Evans Patent No. 2,378,238, that $Co^{60}$ be employed as a tag to distinguish one type of glass from another. However, the use of $Co^{60}$ as a tag or tracer for explosives to enable the detection of such explosives by time-coincident gamma rays emanating from the tag has not been suggested. Further, the above mentioned patent contains no suggestion of the use of coincidence detection of gamma rays, for any purpose.

It will be evident that the radioactive tag or tracer might be applied to the explosive in various fashions. For instance, the radioactive material could be dispersed throughout the explosive material during fabrication thereof, or it might be applied in the form of a paint or coating after the actual fabrication. Further, the tag need not be applied to all constituents of explosive devices, but rather might be applied only to detonators or blasting caps, since the explosives generally available to the public usually require the use of such detonators.

While the amount of radioactive material is not necessarily critical to the invention, it is preferred that at least 0.01 microcurie per manufactured constituent of the explosive device be used, in order that the intensity of radiation from the explosive will be sufficient to insure detection. The upper limit of the amount of material employed will probably be determined by the desire to minimize the health hazard from the radioactive tracer. Such an upper limit may desirably be 10 microcuries per manufactured unit of the explosive. However, it is preferred, in order to maximize the certainty of detection and to minimize the danger to health that between 0.1 and 1 microcurie be applied to each manufactured unit or constituent of explosive.

While the type of detection actually employed is not critical to the present invention, the method of detection will be further described in conjunction with the accompanying drawing in which the single figure schematically represents an explosive tagged with a suitable radioactive material positioned in a suitcase between a pair of gamma ray detectors.

Referring to the single figure of the drawing, a suitcase is generally shown at 10 as containing an explosive such as a stick of dynamite generally indicated at 11 and buried in clothes and other absorbing material 12. A radioactive tag of the type described above is concentrated at the position 13, but may as well be dispersed throughout the explosive. When the suitcase is to be examined for the presence of an explosive, it is passed between a pair of gamma ray detectors generally indicated at 14 and 15, and which are positioned at opposite sides of the direction of travel of the luggage to detect opposite direction gamma rays R, as developed by positron annihilation. A third detector 15' may also be employed to detect the gamma ray R' emitted simultaneously with each positron, by the positron emitter.

The luggage may be positioned on a conveyor passing between the detectors and a separate detection system of the same type may be positioned adjacent a door or passageway through which passengers must proceed to board the flight, in order that explosives hidden on the passenger's body may be detected. Alternatively, inspection of both luggage and passengers may be accomplished simultaneously by a single detection system if the passengers are required to carry their baggage through the detection area.

The detectors may be of any suitable type including the various crystal, liquid and solid scintillator detectors. These detectors furnish output pulses of voltage which are directed to a suitable logic AND, or coincidence circuit 16. Suitable amplifiers and discriminators may be connected between the respective detector and the AND 16 to both amplify the weak pulses from the detectors and to discriminate against low voltage pulses representing noise. For instance, if the source 13 is a positron emitter, the discriminators may be set to pass only pulses representing gamma rays of greater than about 0.5 mev. energy, since positron annihilation gamma rays have energy levels of 0.51 mev.

When an input is present at the AND 16 from each of the detectors, the AND delivers an output pulse which operates an indicator 17. The indicator may be of any suitable type such as a warning bell or flashing light and may be maintained in operation for a suitable time period after the generation of the pulse of voltage from the AND 16.

It will be appreciated that the detection apparatus generally illustrated above is not at all critical to the present invention. All that is necessary is that there be provided a plurality of detectors and associated equipment such as to provide an indication of some type whenever gamma rays are detected by such plurality of detectors. The detector apparatus may also be calibrated in the absence of luggage containing an explosive, in order that any background coincidence counting rate may be compensated for automatically.

It will be appreciated from the above that any constituent of an explosive device, including the charge, the primer or booster (if any), and the detonator or blasting cap may be labeled, and any explosive device containing the labeled element could then be detected by the method disclosed hereinabove. The material actually tagged or labeled will obviously be selected in accordance with various considerations, such as the minimum amount of added expense in manufacture or other preparation, coincident with the maximum amount of security against the storage of baggage containing an explosive on an airplane. Obviously it would also be possible to detect explosives in hand-carried items of baggage, such as hat boxes, camera cases, briefcases and the like. For instance, a special conveyor might be provided adjacent the boarding area onto which each passenger would be required to place hand baggage, and pick up such baggage after it has been passed through the detection station.

It will be further understood that the invention is not to be considered limited to the tagging only of materials which are explosive in themselves. For instance, it might be desirable to tag non-explosive elements or compounds generally available on the market and which can be associated with other elements for the home manufacture of explosives such as rocket propellents. Thereby an even higher assurance might be obtained, through use of the detection method of this invention, that no explosive material has been stowed aboard the airplane.

It will be evident that many changes could be made in the particular elements of the present invention. The invention is not to be considered limited to the particular type of detector employed, so long as at least a pair of detectors of gamma radiation are used. Further, the invention is not to be considered limited to the use of any particular radioactive material, so long as such material furnishes at least a pair of time-coincident gamma rays. Nevertheless, it is very definitely preferred that the radioactive material be a positron emitter, because the direction correlation of the annihilation gamma rays caused by such radioactive material makes it a great deal easier and less expensive to detect the presence of explosives in airline baggage and on airline passengers, in a minimum of time, than would be the case with another type of radioactive tracer.

The invention is to be considered limited only by the scope of the appended claims.

I claim:
1. The method of detection of hidden explosives in or on carriers such as airline baggage and airline passengers which comprises associating radioactive material with at least one constituent of an explosive in such fashion that each unit of such constituent is tagged by the radioactive material, said radioactive material being operative to cause substantially simultaneous emission of a plurality of gamma rays during decay thereof, detecting gamma rays at a plurality of locations adjacent an area through which such carriers must pass, and furnishing an indication when gamma rays are substantially simultaneously detected at a plurality of such locations.

2. The method of claim 1 in which said constituent is a detonator and said radioactive material is dispersed in each detonator in the amount of 0.1 to 1 microcurie.

3. The method of claim 1 in which said radioactive material comprises at least 0.01 microcurie per manufactured unit of explosive material.

4. The method of claim 3 in which said constituent is a detonator and said radioactive material is a positron emitter dispersed in each detonator in the amount of 0.1 to 1 microcurie, such positron emitter functioning to produce coincidence gamma rays during annihilation of positrons emitted therefrom.

5. The method of claim 3 in which said radioactive material is a positron emitter placed in the amount of 0.1 to 1 microcurie per manufactured unit of explosive material such positron emitter functioning to produce a first gamma ray and a positron in time coincidence during decay thereof, and a pair of oppositely-directed gamma rays by positron annihilation in substantial time coincidence with said first gamma rays, said detecting step is performed at three positions adjacent such carriers, two of such positions at opposite sides thereof, and said indication is furnished only when detections occur substantially simultaneously at all said positions.

6. The method of claim 4 in which such detecting step is performed at a pair of detectors at opposite sides of such carriers.

References Cited by the Examiner

UNITED STATES PATENTS

| | | | |
|---|---|---|---|
| 2,401,723 | 6/1946 | Deming | 250—106 |
| 2,474,271 | 6/1949 | Meyer | 250—106 |
| 2,903,590 | 9/1959 | Somerville | 250—83.4 |
| 3,041,454 | 6/1962 | Jones | 250—83.6 |

OTHER REFERENCES

Pocket Encyclopedia of Atomic Energy by Gaynor, published 1950 by Philosophical Library Inc., New York, pages 86 and 94.

The Use of Radioactive Dynamite as a Safety Measure in Mines by Eichholz et al., The Canadian Mining and Metallurgical Bulletin for March 1957, vol. 50, pages 117 to 120.

RALPH G. NILSON, *Primary Examiner.*

JAMES W. LAWRENCE, *Assistant Examiner.*